United States Patent [19]

van Gurp et al.

[11] Patent Number: 4,472,731
[45] Date of Patent: Sep. 18, 1984

[54] COLOR TELEVISION RECEIVER HAVING A TRANSCODING CIRCUIT

[75] Inventors: Wilhelmus A. J. van Gurp; Antonius F. C. W. van Keeken; Eddy M. P. R. van Damme, all of Eindhoven, Netherlands

[73] Assignee: U.S. Philips Corporation, New York, N.Y.

[21] Appl. No.: 396,531

[22] Filed: Jul. 8, 1982

[30] Foreign Application Priority Data

Jul. 23, 1981 [NL] Netherlands .......................... 8103478

[51] Int. Cl.³ .............................................. H04N 9/42
[52] U.S. Cl. ...................................................... 358/11
[58] Field of Search .......................................... 358/11

[56] References Cited
U.S. PATENT DOCUMENTS 4,233,622  11/1980  Groeneweg ........................... 358/11

Primary Examiner—John C. Martin
Assistant Examiner—Jeffrey Sutherland
Attorney, Agent, or Firm—Thomas A. Briody; William J. Streeter

[57] ABSTRACT

In a PAL-SECAM color television receiver comprising a transcoder for converting a SECAM signal into a signal which is processable by a PAL decoder, and a systems change-over switch which can be operated by a SECAM identification circuit for automatically adapting the receiver to the reception of PAL or SECAM signals, a blocking circuit which can be operated by a PAL identification signal is used, which blocking circuit in the event a PAL signal is received blocks the output signal from the SECAM identification circuit so that also in the event that a disturbed PAL signal is received said output signal does not adjust the systems change-over switch to the incorrect position.

1 Claim, 1 Drawing Figure

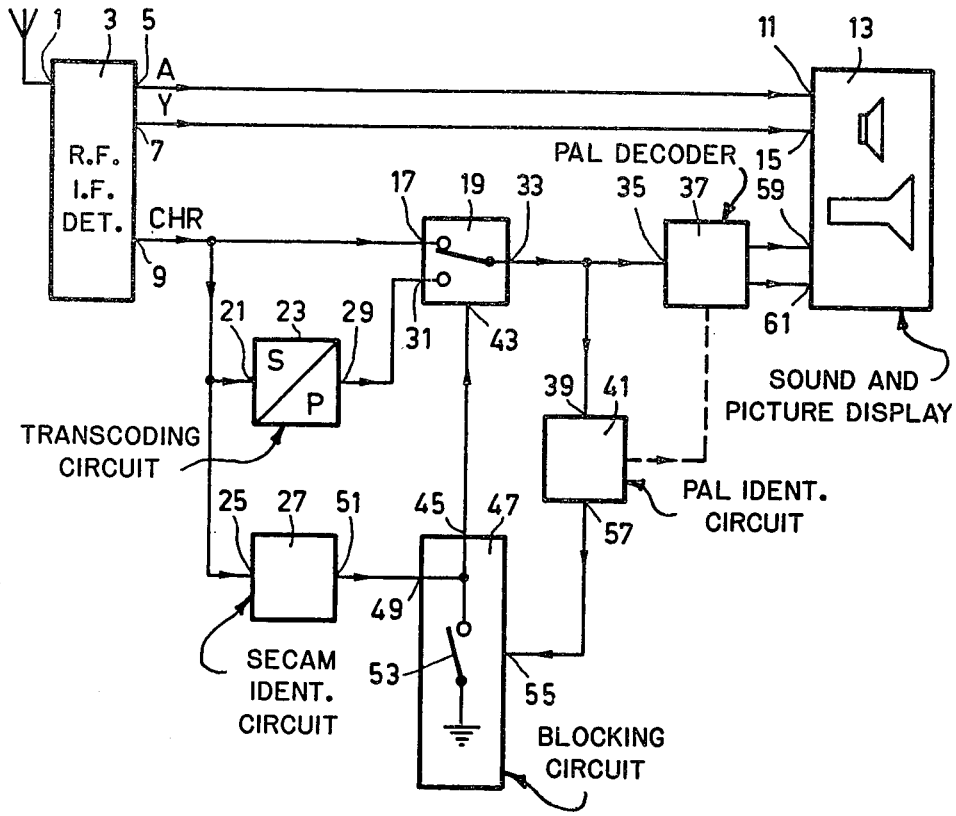

COLOR TELEVISION RECEIVER HAVING A TRANSCODING CIRCUIT

BACKGROUND OF THE INVENTION

1. Field of the Invention

The invention relates to a colour television receiver comprising a transcoding circuit for transcoding a SECAM chrominance signal into a chrominance signal which is processable by a PAL decoding circuit, a systems change-over switch coupled to an input and to an output of the transcoding circuit, a SECAM identification circuit coupled to an input of the transcoding circuit, an output of the identification circuit being coupled to a control signal input of the systems change-over switch, and a PAL identification circuit coupled to an output of the systems change-over switch.

2. Description of the Prior Art

European patent application No. 003169 discloses a colour television receiver of the above-mentioned type. In such a colour television receiver a circuit which responds to reference signals having the carrier wave frequencies of the frequency-moduated colour difference signal on the back porches of the line synchronisation signals or to identification signals in the field flyback may be used as the SECAM identification circuit. However, sometimes it appears that such a circuit responds to a PAL chrominance signal. In that event the systems change-over switch may move to the SECAM position on reception of a PAL signal, causing the colour rendering to be disturbed. It is an object ot the invention to prevent this.

SUMMARY OF THE INVENTION

According to the invention, a colour television receiver of the type described in the opening paragraph is therefore characterized in that the output of the SECAM identification circuit is coupled to the control signal input of the systems change-over switch via a blocking circuit, an input of this blocking circuit being coupled to an output of the PAL identification circuit, while the blocking circuit is of such a construction that an output signal from the SECAM identification circuit is blocked at the occurrence of an output signal from the PAL identification circuit.

As it has been found that PAL identification circuits also respond correctly to disturbed PAL colour synchronizing signals and in general not to SECAM signals, this measure will prevent the systems change-over switch from switching to the SECAM position on reception of a disturbed PAL colour synchronizing signals which would render a correct display of a received signal impossible.

DESCRIPTION OF THE DRAWING

The invention will now be described by way of example with reference to the drawing which comprises only one FIGURE, which shows a simplified block diagram of a colour television receiver in accordance with the invention.

DESCRIPTION OF THE PREFERRED EMBODIMENTS

In the FIGURE, a received colour television signal is applied to an input 1 of a radio frequency, intermediate frequency and detection portion 3. As a result thereof there appears at an output 5 of this portion 3 a sound signal A, at an output 7 a luminance signal Y and at an output 9 a chrominance signal Chr which may be either a PAL signal or a SECAM signal.

The sound signal A is applied to an input 11 of a sound and picture reproducing portion 13, to a further input 15 of which the luminance signal Y is applied.

The chrominance signal Chr is applied to an input 17 of a systems change-over switch 19, to an input 21 of a transcoding circuit 23 and to an input 25 of a SECAM identification circuit 27.

The transcoding circuit 23 converts a SECAM chrominance signal into a signal which is processable by a PAL decoder and becomes available at an output 29 and is applied to an input 31 of the systems change-over switch 19.

The systems change-over switch 19 has an output 33, which is connected to an input 35 of a PAL decoder 37 and to an input 39 of a PAL identification circuit 41, and a control signal input 43, which is connected to an output 45 of a blocking circuit 47. An input 49 of the blocking circuit 47 receives a SECAM system identification signal from the SECAM identification circuit on reception of a SECAM colour television signal. This system identification signal is applied to the output 45 of the blocking circuit 47 if a switch 53, which is connected to the input 49 and to the output 45, is in the position shown in the drawing. This is the case when no PAL system identification signal is applied to an input 55 of the blocking circuit 47. This input 55 is connected to an output 57 of the PAL identification circuit 41, which on reception of a PAL signal produces a PAL system identification signal.

The time constant of the SECAM identification circuit 27 is made somewhat greater than the time constant of the PAL identification circuit 41.

If an undisturbed PAL signal is received, then the SECAM identification circuit 27 does not supply a signal from its output 51. The switch 53 of the blocking circuit 47 is then in the position not shown in response to a signal supplied by the PAL identification circuit 41 from its output 57 and consequently no signal is produced at the output 45 of the blocking circuit 47 as a result of which the systems change-over switch 19 is in the position shown in the drawing. This systems change-over switch then transmits a PAL chrominance signal to the input 35 of the PAL decoder 37.

On reception of a SECAM signal the PAL identification circuit 41 does not supply a signal from its output 57. The switch 53 of the blocking circuit 47 is then in the position shown in the drawing. The SECAM identification circuit 27 produces at its output 51 a SECAM system identification signal, which is transmitted to the control signal input 43 of the systems change-over switch 19 via the blocking circuit 47 which then is not in the blocking mode. The systems change-over switch is then adjusted to the position not shown in the drawing, so that a SECAM signal transcoded by the transcoding circuit 23 is applied to the input 35 of the PAL decoder 37. This signal is suitable for processing by the PAL decoder 37.

On reception of a PAL signal which has been disturbed, for example, as found by Applicants, by echoes or by SECAM signal residues of the signal is supplied by a SECAM-PAL transcoder of a community antenna television system, the SECAM identification circuit 27 applies a signal to the input 49 of the blocking circuit 47 after a period of time determined by its time constant. This signal is then, however, blocked by a PAL system identification signal which appeared at a prior moment as the result of a smaller time constant of the PAL identification circuit 41, so that the switch 53 is in the position not shown in the drawing. The systems change-over switch 19 then remains in the position shown, so that a PAL chrominance signal is applied to the input 35 of the PAL decoder 37.

The PAL decoder 37 has two outputs 59, 61 at which colour difference signals are produced, which are applied to the display portion 13.

The PAL identification circuit 41 may be a prior art circuit comprising a synchronous detector to which the PAL colour synchronizing signal and a reference signal from a chrominance carrier oscillator are applied. This oscillator has a control loop which acts on the colour synchronizing signal and whose pull-in period partly determines the time constant of the PAL identification circuit 41.

The time constant of the SECAM identification circuit 27 can, for example, be increased by connecting to its output 51, in parallel with the customary capacitance, the other side of which is connected to earth, a sufficiently large capacitance in series with a parallel arrangement of a resistor and a diode. The diode ensures that when the SECAM signal disappears, the charge of the large capacitance can be rapidly eliminated. In an integrated implementation of the circuit this does not require an additional terminal. A colour killer signal which, also in the case of an integrated implementation of the circuit, is usually applied to a terminal of the integrated circuit may be used as the output signal of the PAL identification circuit 41, so that this identification circuit does also not require an additional terminal.

It will be clear that the blocking circuit 47 may be of a different construction if so desired. It may, for example, be an AND-gate a non-inverting input of which is connected to the input 49, an inverting input to the input 55 and the output to the output 45 of the blocking circuit 47. If the polarities of the output signals of the identification circuit 27, 41 or of the control signal of the systems change-over switch 19 are chosen differently then the blocking circuit 47 must be adapted thereto.

The drawing shows the PAL identification circuit 41 as a separate circuit, but it usually forms part of the PAL decoder 37. It may also be used to synchronize the change-over of an input signal of one of the colour difference signals demodulators, which change-over is indispensable in the decoder. This is shown in the FIGURE by means of a broken line.

The systems change-over switch 19 is shown in the drawing as a single change-over switch. It will be clear that it may be of a more complicated construction and may, for example, be partly incorporated in the PAL decoder and/or the transcoding circuit.

Circuit elements such as, for example, filters, limiters, amplifiers which are not important for understanding the operation of the circuit in accordance with the invention are not shown in detail in the FIGURE. It will be clear that, for example, the signal path to the inputs 21 and 25 of the transcoding circuit 23 and the SECAM identification circuit 27, respectively, may include a SECAM filter (ball filter) and a limiter, and the signal path comprising the change-over contact 17, 33 of the change-over switch 19 may include a PAL filter and an amplifier.

What is claimed is:

1. In a colour television receiver comprising a transcoding circuit for transcoding a SECAM chrominance signal into a chrominance signal processable by a PAL decoding circuit, a systems change-over switch coupled to an input and to an output of the transcoding circuit, a SECAM identification circuit coupled to an input of the transcoding ciruit, an output of the identification circuit being coupled to a control signal input of the systems change-over switch, and a PAL identification circuit coupled to an output of the systems change-over switch, the improvement wherein the output of the SECAM identification circuit is coupled to the control signal input of the systems change-over switch via a blocking circuit, an input of this blocking circuit being coupled to an output of the PAL identification circuit, while the blocking circuit is of such a construction that an output signal from the SECAM identification circuit is blocked at the occurrence of an output signal from the PAL identification circuit.

* * * * *